United States Patent
Eriksen et al.

(10) Patent No.: US 8,065,275 B2
(45) Date of Patent: Nov. 22, 2011

(54) SYSTEMS AND METHODS FOR CACHE OPTIMIZATION

(75) Inventors: Bjorn Marius Aamodt Eriksen, Mountain View, CA (US); Othman Laraki, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 479 days.

(21) Appl. No.: 11/675,601

(22) Filed: Feb. 15, 2007

(65) Prior Publication Data

US 2008/0201331 A1    Aug. 21, 2008

(51) Int. Cl.
*G06F 7/00* (2006.01)
(52) U.S. Cl. .................. 707/661; 711/118; 709/212
(58) Field of Classification Search .............. 707/10, 707/100, 200, 203, 204, 205, E17.03, E17.11, 707/E17.01, 202, 610, 616, 625, 639, 640, 707/648, 649, 661, 662, 665, 666, 674, 694, 707/695, 702, 821; 711/137, 141, 113, 100, 711/111, 161, 162, 11; 709/217, 218, 219, 709/236, 212; 715/202, 744
See application file for complete search history.

(56) References Cited

U.S. PATENT DOCUMENTS

| | | | |
|---|---|---|---|
| 4,953,106 A | 8/1990 | Gansner et al. | 364/521 |
| 5,450,535 A | 9/1995 | North | 395/140 |
| 5,727,129 A | 3/1998 | Barrett et al. | 395/12 |
| 5,748,954 A | 5/1998 | Mauldin | 395/610 |
| 5,752,241 A | 5/1998 | Cohen | 707/3 |
| 5,802,292 A | 9/1998 | Mogul | 395/200.33 |
| 5,832,494 A | 11/1998 | Egger et al. | 707/102 |
| 5,835,905 A | 11/1998 | Pirolli et al. | 707/3 |
| 5,848,407 A | 12/1998 | Ishikawa et al. | 707/2 |
| 5,878,223 A | 3/1999 | Becker et al. | 395/200.53 |
| 5,946,697 A | 8/1999 | Shen | 707/104 |
| 5,978,791 A | 11/1999 | Farber et al. | 707/2 |
| 5,978,847 A | 11/1999 | Kisor et al. | 709/227 |
| 6,003,030 A | 12/1999 | Kenner et al. | 707/10 |
| 6,014,678 A | 1/2000 | Inoue et al. | 707/501 |
| 6,023,726 A | 2/2000 | Saksena | 709/219 |

(Continued)

FOREIGN PATENT DOCUMENTS

EP    1182589 A2    2/2002

(Continued)

OTHER PUBLICATIONS

International Search Report and Written Opinion for International Application No. PCT/US2008/054167, mailed Jul. 2, 2008.

(Continued)

*Primary Examiner* — Greta Robinson
(74) *Attorney, Agent, or Firm* — Morgan, Lewis & Bockius LLP

(57) ABSTRACT

A server computer identifies a cached document and its associated cache update history in response to a request or in anticipation of a request from a client computer. The server computer analyzes the document's cache update history to determine if the cached document is de facto fresh. If the cached document is de facto fresh, the server computer then transmits the cached document to the client computer. Independently, the server computer also fetches an instance of the document from another source like a web host and updates the document's cache update history using the fetched instance of the document.

13 Claims, 11 Drawing Sheets

U.S. PATENT DOCUMENTS

| | | | | |
|---|---|---|---|---|
| 6,029,175 A * | 2/2000 | Chow et al. | | 707/104.1 |
| 6,055,569 A | 4/2000 | O'Brien et al. | | 709/223 |
| 6,067,565 A | 5/2000 | Horvitz | | 709/219 |
| 6,085,193 A | 7/2000 | Malkin et al. | | 707/10 |
| 6,085,226 A | 7/2000 | Horvitz | | 709/203 |
| 6,088,707 A | 7/2000 | Bates et al. | | 707/501 |
| 6,098,064 A * | 8/2000 | Pirolli et al. | | 707/2 |
| 6,108,703 A | 8/2000 | Leighton et al. | | 709/226 |
| 6,128,644 A | 10/2000 | Nozaki | | 709/203 |
| 6,128,701 A | 10/2000 | Malcolm et al. | | 711/133 |
| 6,134,551 A | 10/2000 | Aucsmith | | 707/10 |
| 6,134,583 A * | 10/2000 | Herriot | | 709/217 |
| 6,167,438 A | 12/2000 | Yates et al. | | 709/216 |
| 6,178,461 B1 | 1/2001 | Chan et al. | | 709/247 |
| 6,182,122 B1 | 1/2001 | Berstis | | 709/217 |
| 6,182,133 B1 | 1/2001 | Horvitz | | 709/223 |
| 6,195,622 B1 | 2/2001 | Altschuler et al. | | 703/2 |
| 6,205,481 B1 | 3/2001 | Heddaya et al. | | 709/226 |
| 6,230,168 B1 | 5/2001 | Unger et al. | | 707/501 |
| 6,272,534 B1 | 8/2001 | Guha | | 709/216 |
| 6,282,542 B1 | 8/2001 | Carneal et al. | | 707/10 |
| 6,285,999 B1 | 9/2001 | Page | | 707/5 |
| 6,292,880 B1 | 9/2001 | Mattis et al. | | 711/216 |
| 6,338,066 B1 | 1/2002 | Martin et al. | | 707/10 |
| 6,405,252 B1 | 6/2002 | Gupta et al. | | 709/224 |
| 6,421,726 B1 | 7/2002 | Kenner et al. | | 709/225 |
| 6,484,143 B1 | 11/2002 | Swildens et al. | | 705/1 |
| 6,493,702 B1 | 12/2002 | Adar et al. | | 707/3 |
| 6,502,125 B1 | 12/2002 | Kenner et al. | | 709/203 |
| 6,516,320 B1 | 2/2003 | Odom et al. | | 707/101 |
| 6,532,520 B1 | 3/2003 | Dean et al. | | 711/133 |
| 6,553,411 B1 | 4/2003 | Dias et al. | | 709/219 |
| 6,578,113 B2 | 6/2003 | Krishnamurthy et al. | | 711/141 |
| 6,581,090 B1 | 6/2003 | Lindbo et al. | | 709/217 |
| 6,584,498 B2 | 6/2003 | Nguyen | | 709/219 |
| 6,625,643 B1 | 9/2003 | Colby et al. | | 709/217 |
| 6,631,451 B2 * | 10/2003 | Glance et al. | | 711/158 |
| 6,638,314 B1 | 10/2003 | Meyerzon et al. | | 715/513 |
| 6,665,726 B1 | 12/2003 | Leighton et al. | | 709/231 |
| 6,742,033 B1 | 5/2004 | Smith et al. | | 709/224 |
| 6,744,452 B1 | 6/2004 | McBrearty et al. | | 345/853 |
| 6,757,733 B2 | 6/2004 | Gupta | | 709/229 |
| 6,766,422 B2 | 7/2004 | Beyda | | 711/137 |
| 6,772,225 B1 | 8/2004 | Jennings, III et al. | | 709/240 |
| 6,813,690 B1 | 11/2004 | Lango et al. | | 711/118 |
| 6,853,391 B2 | 2/2005 | Bates et al. | | 345/854 |
| 6,883,135 B1 | 4/2005 | Obata et al. | | 715/500 |
| 6,912,591 B2 | 6/2005 | Lash | | 709/246 |
| 6,973,457 B1 | 12/2005 | Bastawala et al. | | 707/10 |
| 7,003,566 B2 | 2/2006 | Codella et al. | | 709/224 |
| 7,035,921 B1 | 4/2006 | Baker | | 709/224 |
| 7,051,111 B1 | 5/2006 | Scullin | | 709/232 |
| 7,100,123 B1 | 8/2006 | Todd et al. | | 715/862 |
| 7,130,876 B2 | 10/2006 | de Bonet | | 707/203 |
| 7,130,890 B1 | 10/2006 | Kumar et al. | | 709/218 |
| 7,185,001 B1 | 2/2007 | Burdick et al. | | 707/3 |
| 7,249,053 B2 | 7/2007 | Wohlers et al. | | 705/14 |
| 7,328,401 B2 | 2/2008 | Obata et al. | | 715/501.1 |
| 7,398,271 B1 | 7/2008 | Borkovsky et al. | | 707/7 |
| 7,437,364 B1 * | 10/2008 | Fredricksen et al. | | 1/1 |
| 7,437,409 B2 | 10/2008 | Danieli | | 709/204 |
| 7,437,725 B1 | 10/2008 | Chang et al. | | 718/100 |
| 7,461,155 B2 | 12/2008 | Reisman | | 709/227 |
| 7,548,908 B2 | 6/2009 | Fu et al. | | 707/3 |
| 7,565,425 B2 | 7/2009 | Van Vleet et al. | | 709/224 |
| 7,660,844 B2 * | 2/2010 | Takase et al. | | 709/203 |
| 2001/0020248 A1 | 9/2001 | Banga et al. | | 709/219 |
| 2001/0033557 A1 | 10/2001 | Amalfitano | | 370/335 |
| 2002/0002618 A1 | 1/2002 | Vange | | 709/228 |
| 2002/0016786 A1 | 2/2002 | Pitkow et al. | | 707/3 |
| 2002/0023159 A1 | 2/2002 | Vange et al. | | 709/228 |
| 2002/0078371 A1 | 6/2002 | Heilig et al. | | 713/200 |
| 2002/0082811 A1 | 6/2002 | Honjas et al. | | 703/2 |
| 2002/0097261 A1 | 7/2002 | Gottfurcht et al. | | 345/738 |
| 2002/0107935 A1 | 8/2002 | Lowery et al. | | 709/216 |
| 2002/0143892 A1 | 10/2002 | Mogul | | 709/217 |
| 2002/0143984 A1 | 10/2002 | Hudson | | 709/238 |
| 2002/0156864 A1 | 10/2002 | Kniest | | 709/217 |
| 2002/0161860 A1 | 10/2002 | Godlin et al. | | 709/219 |
| 2002/0184340 A1 | 12/2002 | Srivastava et al. | | 709/219 |
| 2002/0188665 A1 | 12/2002 | Lash | | 709/203 |
| 2002/0191610 A1 | 12/2002 | Baek et al. | | 370/390 |
| 2002/0198961 A1 | 12/2002 | Krishnamurthy et al. | | 709/217 |
| 2003/0005152 A1 | 1/2003 | Diwan et al. | | 709/239 |
| 2003/0023813 A1 | 1/2003 | Malcolm | | 711/119 |
| 2003/0046343 A1 | 3/2003 | Krishnamurthy et al. | | 709/203 |
| 2003/0079027 A1 | 4/2003 | Slocombe et al. | | 709/229 |
| 2003/0084159 A1 | 5/2003 | Blewett | | 709/226 |
| 2003/0101234 A1 | 5/2003 | McBrearty et al. | | 709/218 |
| 2003/0167257 A1 | 9/2003 | de Bonet | | 707/1 |
| 2003/0172075 A1 | 9/2003 | Reisman | | 707/10 |
| 2003/0217173 A1 | 11/2003 | Butt et al. | | 709/237 |
| 2004/0049598 A1 | 3/2004 | Tucker et al. | | 709/246 |
| 2004/0064577 A1 | 4/2004 | Dahlin et al. | | 709/235 |
| 2004/0073707 A1 | 4/2004 | Dillon | | 709/245 |
| 2004/0078453 A1 | 4/2004 | Bhogal et al. | | 709/219 |
| 2004/0107296 A1 | 6/2004 | Donker et al. | | 709/245 |
| 2004/0205149 A1 | 10/2004 | Dillon et al. | | 709/217 |
| 2004/0225644 A1 | 11/2004 | Squillante et al. | | 707/3 |
| 2004/0237044 A1 | 11/2004 | Travieso et al. | | 715/530 |
| 2004/0239681 A1 | 12/2004 | Robotham et al. | | 345/581 |
| 2004/0262051 A1 | 12/2004 | Carro | | 178/18.05 |
| 2005/0033803 A1 | 2/2005 | Vleet et al. | | 709/203 |
| 2005/0038787 A1 | 2/2005 | Cheung et al. | | 707/9 |
| 2005/0138604 A1 | 6/2005 | Harrison | | 717/121 |
| 2005/0165778 A1 | 7/2005 | Obata et al. | | 707/5 |
| 2005/0165829 A1 | 7/2005 | Varasano | | 707/102 |
| 2005/0246347 A1 | 11/2005 | Kobayashi | | 707/10 |
| 2005/0278222 A1 | 12/2005 | Nortrup | | 705/17 |
| 2005/0278417 A1 | 12/2005 | Fremantle et al. | | 709/203 |
| 2006/0047804 A1 | 3/2006 | Fredricksen et al. | | 709/224 |
| 2006/0089978 A1 | 4/2006 | Lee et al. | | 709/219 |
| 2006/0143568 A1 | 6/2006 | Milener et al. | | 715/738 |
| 2006/0156387 A1 | 7/2006 | Eriksen | | 726/3 |
| 2006/0167862 A1 | 7/2006 | Reisman | | 707/3 |
| 2006/0168348 A1 | 7/2006 | Casalaina | | 709/246 |
| 2006/0179123 A1 | 8/2006 | Smith | | 709/218 |
| 2006/0294223 A1 | 12/2006 | Glasgow et al. | | 709/224 |
| 2006/0294311 A1 | 12/2006 | Fu et al. | | 711/118 |
| 2007/0174774 A1 | 7/2007 | Lerman et al. | | 715/723 |
| 2007/0189708 A1 | 8/2007 | Lerman et al. | | 386/52 |
| 2007/0214052 A1 | 9/2007 | Kao | | 705/15 |
| 2007/0250841 A1 | 10/2007 | Scahill et al. | | 719/320 |
| 2008/0140626 A1 | 6/2008 | Wilson | | 707/3 |
| 2008/0195819 A1 | 8/2008 | Dumont | | 711/138 |
| 2009/0049388 A1 | 2/2009 | Taib et al. | | 715/738 |
| 2009/0119286 A1 | 5/2009 | Reisman | | 707/5 |
| 2009/0276407 A1 | 11/2009 | Van Vleet et al. | | 707/3 |

FOREIGN PATENT DOCUMENTS

| | | |
|---|---|---|
| GB | 2317723 A | 4/1998 |
| WO | WO 01/55897 A1 | 8/2001 |
| WO | WO 02/100117 A1 | 12/2002 |
| WO | WO 2005/006129 | 1/2005 |

OTHER PUBLICATIONS

Bestavros, A., et al., "Server-initiated Document Dissemination for the WWW," *IEEE Data Engineering Bulletin*, 19(3):3-11, Sep. 1996, pp. 1-8.

Bruck, J., et al., "Weighted Bloom Filter," Information Theory, 2006 IEEE, Jul. 1, 2006 pp. 2304-2308.

Cao, P., et al., "A Study of Integrated Prefetching and Caching Strategies," *Proceeding of 1995 ACM SIGMETRICS*, Jun. 1995, pp. 171-182.

Curewitz, K.M., et al., "Practical Prefetching via Data Compression," *Proceedings of the 1993 ACM Conf. on Management of Data (SIGMOD)*, Washington DC, May 1993, pp. 257-266.

Fan, L., et al., "Web Prefetching Between Low-Bandwidth Clients and Proxies: Potential and Performance," *Proceedings of the ACM SIGMET-RICS Conf.*, May 1999, pp. 178-187.

Gong, X., et al., "Bloom filter-based XML Packets Filtering for Millions of Path Queries," Proceedings of the 21st International Conference on Data Engineering (ICDE 2005), 12 pages.

Griffioen, J., et al., "Reducing File System Latency Using a Predictive Approach," *Proceedings of 1994 USENIX Summer Conf.*, Jun. 1994, pp. 197-207.

Gwertzman, J.S., et al., "The Case for Geographical Push-Caching," *Proceedings on the 1995 Workshop on Hot Operating Systems*, 1995, 5 pages.

Kimbrel, T., et al., "Integrated Parallel Prefetching and Caching," *Proceedings of the 1996 ACM SIGMETRICS Int'l Conf. on Measurement and Modeling of Computer Systems*, 1996, pp. 262-263.

Kroeger, T.M., et al., Digital's Web Proxy Traces, ftp://ftp.digital.com/pub/DEC/traces/proxy/webtraces.html, Dec. 1996.

Markatos, E.P., et al., "A Top-10 Approach to Prefetching on the Web," *Technical Report No. 173, ICS-FORTH*, Heraklion, Crete, Greece, Aug. 1996, pp. 1-15.

Padmanabhan, V.N., et al., "Using Predictive Prefetching to Improve World Wide Web Latency," ACM SIGCOMM Computer Communication Review, Jul. 1996, 15 pages.

Palmer, M., et al., "Fido: A Cache That Learns to Fetch," *Proceedings of the 17th Int'l Conf. on Very Large Data Bases*, Barcelona, Spain, Sep. 1999, pp. 255-264.

Patterson, R.H., et al., "Informed Prefetching and Caching," *Proceedings of the 15th ACM Symposium on Operating Systems Principles*, Dec. 1995, pp. 79-95.

Schilit, B.N., et al., "TeleWeb: Loosely Connected Access to the World Wide Web," 5th Int'l World Wide Web Conference, Paris, France, May 6-10, 1996.

Tait, C.D., et al., "Detection and Exploitation of File Working Sets," *Proceedings of the 11th Int'l Conf. on Distributed Computing Systems*, May 1991, pp. 1-19.

Vitter, J.S., et al., "Optimal Prefetching via Data Compression," *Journal of the ACM*, vol. 43, Sep. 1996, pp. 771-793.

Williams, S., et al., "Removal Policies in Network Caches for World-Wide Web Documents," *Proceedings of ACM SIGCOMM '96 Conf.*, Aug. 1996, pp. 293-305.

Office Action dated Feb. 25, 2009 for related U.S. Appl. No. 11/418,648.

Office Action dated Mar. 5, 2009, for related U.S. Appl. No. 11/418,649.

Arocena Gustavo O. et al., "Applications of a Web Query Language," *Computer Networks and ISDN Systems*; vol. 29, No. 8-13, Aug. 12, 1997, 15 pages.

Banga Gaurav et al., "Optimistic Deltas for WWW Latency Reduction," 1997 USENIX Technical Conference, pp. 1-15.

Botafogo Rodrigo A. et al., "Structural Analysis of Hypertext: Identifying Hierarchies and Userful Metrix," *ACM Transactions on Information Systems*, vol. 10, No. 2, Apr. 1992, pp. 142-180.

Boyle Craig et al., "To Link or not to link: an empirical comparison of hypertext linking strategies," *ACM SIGDOC '92*; 1992; pp. 221-231.

Carriere Jeromy et al., "WebQuery: Searching and Visualizing the Web through Connectivity," *Proceedings of the 6th International World Wide Web Conference*; 1997; 14 pages.

Chan Mun Choon et al., "Cache-based Compaction: a New Technique for Optimizing Web Transfer," IEEE, 1999, 9 pages.

Craswell Nick et al., "Effective Site Finding using Link Anchor Information," *ACM 2001*, Sep. 2001, pp. 250-257.

Doreian Patrick, "A Measure of Standing for Citation Networks within a Wider Environment," *Information Processing and Management*, vol. 30, No. 1, 1994, pp. 21-31.

Doreian Patrick, "Measuring the Relative Standing of Disciplinary Journals," *Information Processing and Management*, vol. 24, No. 1, 1988, pp. 45-56.

Douglis Frederick et al., "Dynamic Suppression of Similarity in the Web: a Case for Deployable Detection Mechanisms," *IBM Research Report*, Jul. 2002, 8 pages.

Frisse Mark E., "Searching for Information in Hypertext Medical Handbook," *Communications of the ACM*, vol. 31, No. 7, Jul. 1998, pp. 880-886.

Garfield Eugene, "Citation Analysis as a Tool in Journal Evaluation," *Essays of an Information Scientist*, vol. 1, 1962-1973, pp. 527-544.

Geller Nancy L., "On the Citation Influence Methodology of Pinski and Narin," *Information Processing and Management*, vol. 14, 1978, pp. 93-95.

Henzinger Monika R. et al., "Measuring Index Quality Using Random Walks on the Web," *Proceedings of the 8th International World Wide Web Conference*, 1999, 35 pages.

Hubbell Charles H., "An Input-Output Approach to Clique Identification Sociometry," University of California Santa Barbara, 1965, pp. 377-399.

International Search Report, PCT/US2005/022067, Jan. 10, 2006, 7 pages.

Katz Leo, "A New Status Index Derived from Sociometric Analysis," *Psychometrika*, vol. 18, No. 1, 1953, pp. 39-43.

Kleinberg Jon M., "Authoritative Sources in a Hyperlinked Environment," *Journal of the ACM*, vol. 46, No. 1, Sep. 1999, pp. 604-632.

Luotonen Ari, "World-Wide Web Proxies," Apr. 1994, pp. 1-8.

Marchiori Massimo, "The Quest for Correct Information on the Web: Hyper Search Engines," 1997, 18 pages.

McBryan Oliver A, "GENVL and WWWW: Tools for Taming the Web," *Proceedings of the 1st International World Wide Web Conference*, May 1994; pp. 1-10 12 pages.

Mizruchi Mark S et al., "Techniques for Disaggregating Centrality Scores in Social Networks," *Sociological Methodology*, 1996, pp. 26-48.

Mogul Jeffrey C. et al., "Delta Encoding in HTTP," *Network Working Group*, Jan. 2002, pp. 1-49.

Mogul Jeffrey C. et al., "Potential benefits of delta encoding and data compression for HTTP," ACM, 1997, pp. 181-194.

Pinski Gabriel et al., "Citation Influence for Journal Aggregates of Scientific Publications: Theory, with Application to the Literature of Physics," *Information Processing and Management*, vol. 12, No. 5-A, 1976; pp. 297-312.

Ramer Arthur, "Similarity, Probability and Database Organization," IEEE, 1996; pp. 272-276, 277.

Rhea Sean C. et al., "Value-Based Web Caching," *Proceedings of the 12th International World Wide Web Conference*, May 2003, pp. 1-10.

Sakaguchi Tetsuo et al., "A Browsing Tool for Multi-lingual Documents for Users without Multi-lingual Fonts," *ACM*, 1996; pp. 63-71.

Wang Zheng et al., "Prefetching in World Wide Web," *IEEE*, 1996; pp. 28-32.

\* cited by examiner

SYSTEMS AND METHODS FOR CACHE OPTIMIZATION

RELATED APPLICATIONS

This application is related to U.S. patent application Ser. No. 10/882,792 now U.S. Pat. No. 7,565,423, "A System and Method of Accessing a Document Efficiently Through Multi-Tier Web Caching," filed on Jun. 30, 2004, which is hereby incorporated by reference in its entirety.

This application is also related to U.S. patent application Ser. No. 11/418,649 now U.S. Pat. No. 7,747,749, "Systems and Methods of Efficiently Preloading Documents to Client Devices," filed on May 5, 2006, which is hereby incorporated by reference in its entirety.

This application is also related to U.S. patent application Ser. No. 11/418,648, "Systems and Methods of Visually Representing Links Associated with Preloaded Content," filed on May 5, 2006, which is hereby incorporated by reference in its entirety.

FIELD

The present invention relates generally to the field of client-server computer network systems, and in particular, to systems and methods for cache optimization.

BACKGROUND

To access a document (e.g., a webpage) on the Internet, a user must download the document from a document source to a client computer using a software application such as a web browser. A document source is typically a web host (sometimes called a web server) but can be a proxy server that prefetches the document from the web host. Upon receipt of a document request from a client, the proxy server first checks if the requested document has been prefetched and stored in its own cache. If not, the proxy server then fetches the requested document from the web host. Even if the requested document is found in the proxy server's cache, it may not be servable to the client if its content is no longer fresh. The freshness of a document's content is usually determined by an expiration timestamp value set by the content provider. If the current time is post the expiration timestamp, the document's content is deemed stale, and if the current time is prior to the expiration timestamp, the document's content is deemed current or not stale.

However, a document's expiration timestamp is not always an accurate prediction of the document content's freshness. For various reasons, there is often no content change to a document even a long time after its associated expiration timestamp is passed. As a result, a proxy server could waste resources downloading documents having identical contents as the ones currently in the proxy server's cache. Moreover, refreshing a document who content has not in fact changes may unnecessarily delay the rendering of the document by a requesting client.

In view of the foregoing, there is a need for new methods of determining the freshness of a cached document more accurately and thereby improving the performance of the proxy server as well as users' web browsing experience.

SUMMARY OF DISCLOSED EMBODIMENTS

According to a first aspect of the present invention, in response to a request or in anticipation of a request from a client computer, a server computer identifies a cached document and its associated cache update history. The server computer analyzes the document's cache update history to determine if the cached document meets predefined criteria. In some embodiments, the predefined criteria include that the document's content is invariant over a predefined set of parameters and the document's content is deemed fresh according to the document's cache update history. If the cached document satisfies at least a subset of the predefined criteria, the server computer then transmits the cached document to the client computer. Independently, the server computer also fetches an instance of the document from another source, such as a web host, and updates the document's cache update history using the fetched instance of the document.

According to a second aspect of the present invention, in response to a request or in anticipation of a request from a client computer, a server computer identifies a cached document and transmits the cached document to the client computer. Independently, the server computer fetches another instance of the document from a different source. Next the server computer compares the cached document against the newly fetched instance. If the two instances are identical, the server computer notifies the client computer to serve the transmitted document to a requesting user.

According to a third aspect of the present invention, in response to a request or in anticipation of a request from a client computer, a server computer identifies a cached document. The server computer encrypts the cached document using a key and then transmits the encrypted document to the client computer. Independently, the server computer fetches an instance of the document from a different source. If the cached document and the fetched instance are identical, the server computer sends the key to the client computer. Using the key, the client computer decrypts the encrypted document and serves the cached document to a requesting user.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Figure 1:
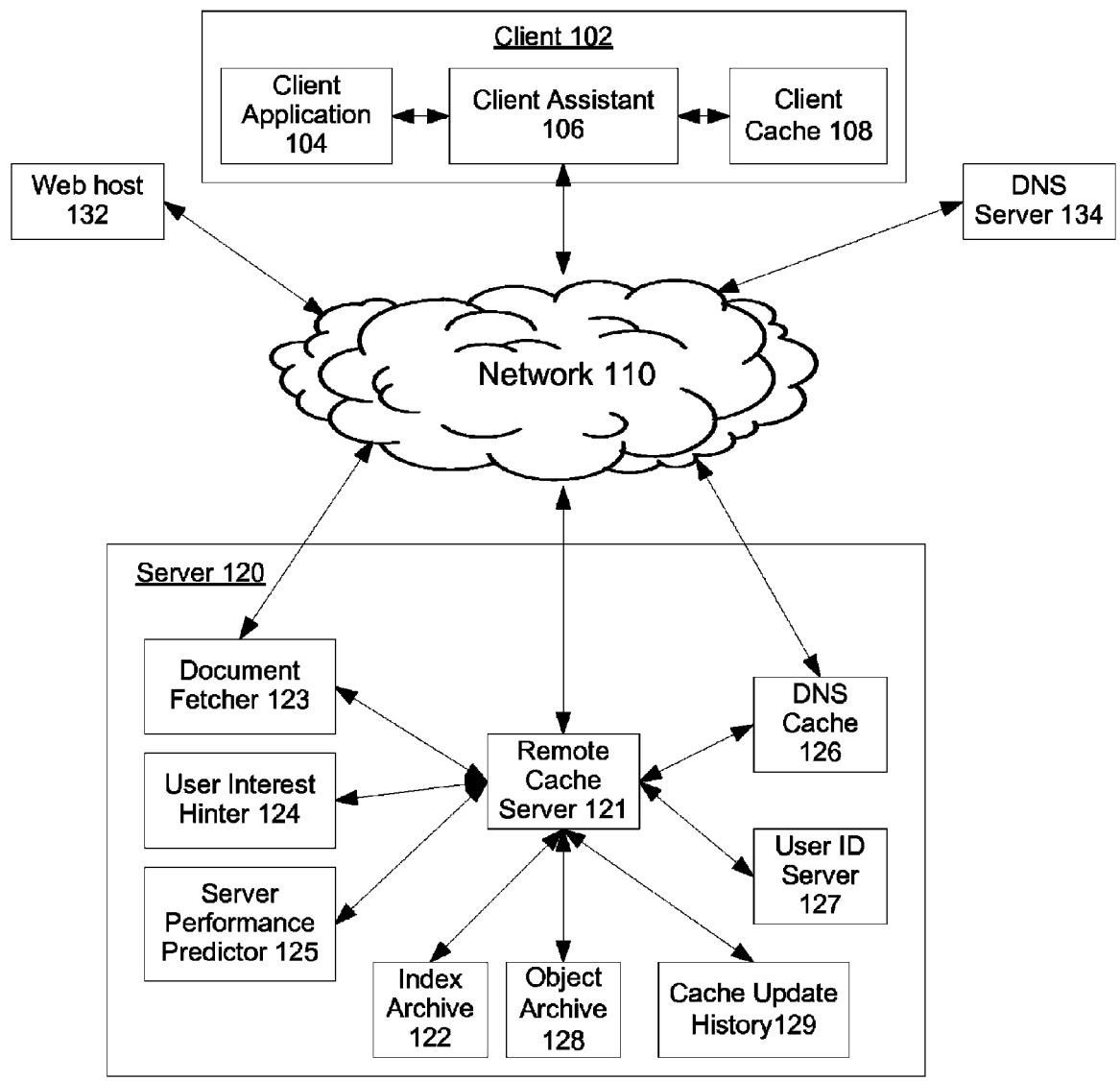
FIG. 1 is a block diagram illustrating the infrastructure of a client-server network environment according to some embodiments of the invention.
Figure 2A:
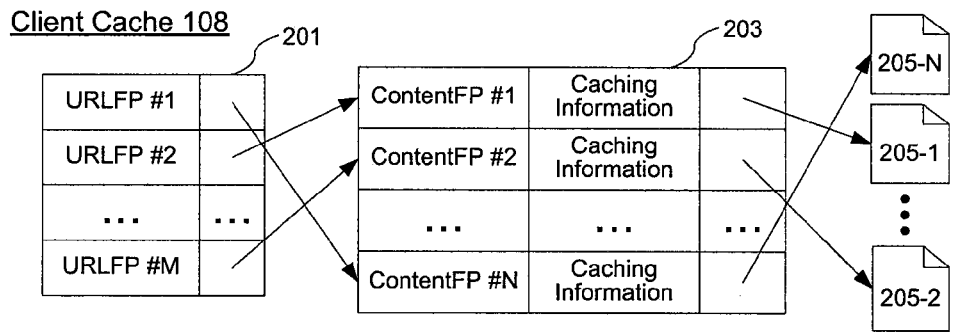
FIGS. 2A-2D depict data structures associated with various components of the client-server network environment according to some embodiments of the invention.
Figure 2B:
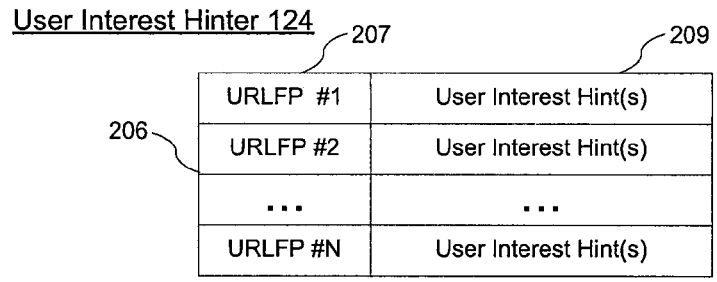
Figure 2C:
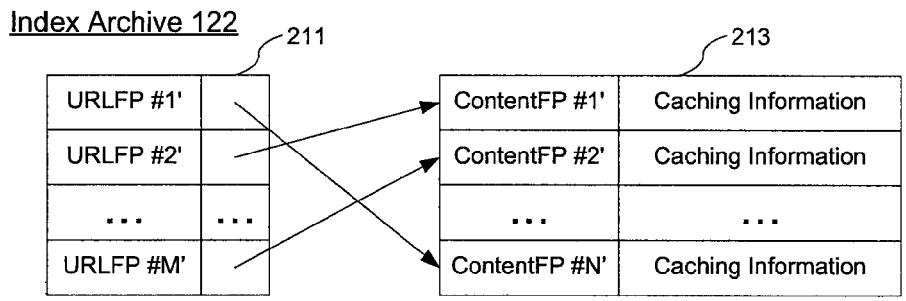
Figure 2D:
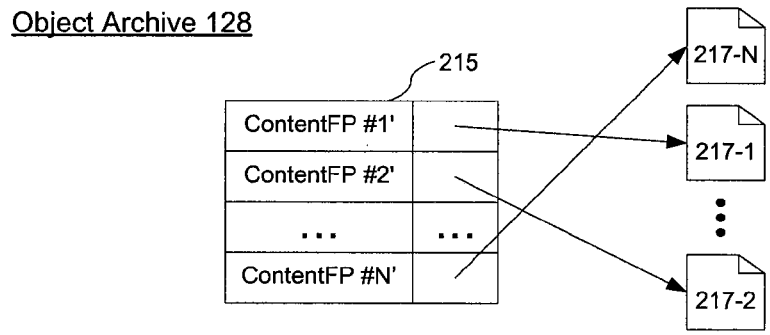

FIG. 1 is a block diagram illustrating the infrastructure of a client-server distributed system 100 according to some embodiments of the invention. The distributed system 100 includes a plurality of clients 102 and a document server 120. The internal structure of a client 102 includes a client application 104 (e.g., a web browser), a client assistant 106 and a client cache 108. The client assistant 106 may establish communication channels with the client application 104, the client cache 108 and a remote cache server 121 residing in the document server 120, respectively. The client assistant 106 and the remote cache server 121 are procedures or modules that facilitate the process of quickly serving a document in response to a document download request initiated by a user of the client 102. The clients 102 (sometimes herein called client devices or client computers) may be any computer or other device that is capable of receiving documents from and send requests associated with document links to the document server 120. Examples include, without limitation, desktop computers, laptop computers, tablet computers, mobile devices such as mobile phones, personal digital assistants, and set-top boxes.

In this embodiment, the client application 104 has no associated cache or does not use its associated cache. Rather, the client application 104 directs all user requests to the client assistant 106. While the following discussion assumes, for illustrative purposes, that the client application 104 is a web browser, the client application can, in fact, be any software application that uses a document identified by a network address such as a URL (universal resource locator). Similarly, the term "URL" means a network address or location in this document. In this context, the term "document" or "object" means virtually any document or content of any format including, but not limited to, text, image, audio, video, etc., that may be used by a web browser or other applications (also called application programs). An advantage of the arrangement shown in FIG. 1 is that all the web browsers or other applications in the client 102 can share the same client cache 108 and thereby avoid data duplication. But in another embodiment, the web browser 104 may use its own cache (not shown). Optionally, the client assistant 106 may synchronize the web browser's cache with the client cache 108 from time to time.

The document server 120 includes at least a remote cache server 121, an index archive 122, and an object archive 128. In some embodiments, the remote cache server 121, the index archive 122 and/or the object archive 128 are deployed over multiple computers to enable fast access to a large number of cached documents. For instance, the index archive 122 and the object archive 128 may be distributed over N servers, with a mapping function such as the "modulo N" function being used to determine which cached documents are stored in each of the N servers. N may be an integer greater than 1, e.g., an integer between 2 and 16,384. For convenience, the document server 120 is treated as though it were a single computer in this document. The document server 120, through its index archive 122 and object archive 128, manages a large number of documents that have been prefetched from various web hosts 132 over one or more communications networks 110 (e.g., the Internet, one or more other global networks, one or more local area networks, one or more metropolitan area networks, one or more wireless networks, or any combination thereof). The term "web host" refers to a source of documents (or more generally, a source of information) stored at network locations (e.g., URL's) associated with the web host. The term "web server" is sometimes used to mean the same thing as "web host."

In some embodiments, the document server 120 includes a document fetcher 123, a user interest hinter 124, a server performance predictor 125, a DNS cache 126, and a user ID server 127. These components may co-exist on a single computer or they may be distributed over multiple computers. As described below, each component is responsible for one or more predefined tasks associated with serving documents to a requesting client or preloading documents to a client before the client requests any of them. The remote cache server 121 coordinates with these components to satisfy user requests from different clients 102.

In some embodiments, the remote cache server 121 provides a set of network addresses (e.g., URLs) and IP addresses of the associated web hosts 132 to the document fetcher 123. The set of network addresses identifies documents to be downloaded from the web hosts 132. The DNS cache 126 is used for resolving the IP address of a web host 132. The address records in the DNS cache 126 are updated by a third-party DNS server 134 to make sure that any address record in the DNS cache 126 is presumptively fresh and may be used by the document fetcher 123 for downloading documents. If no address record is found in the DNS cache 126, the remote cache server 121 may query the DNS server 134 directly for the IP address associated with a web host 132.

After receiving the network addresses and IP addresses, the document fetcher 123 issues requests to respective web hosts 132 to fetch the documents requested by the remote cache server 121. For each fetched document, the remote cache server 121 conducts a few further processing procedures including, e.g., generating relevant entries in the index archive 122 and the object archive 128 for the prefetched document, and parsing the document to determine what document links and objects (e.g., images) are embedded in the document. To ensure the freshness of the document contents in the document server 120, the remote cache server 121 updates entries in the index archive 122 and the object archive 128 according to a predefined schedule. When the content of a cached document is found to have changed, the update operation uses the document fetcher 123 to fetch a current version of the document from its web host 132.

Whenever the remote cache server 121 receives a user request for a document, it identifies the requested document in the index archive 122 and the object archive 128. The requested document is then returned to the requesting client 102. To better serve the user, the remote cache server 121 attempts to predict what subsequent documents the user would like to see after viewing the currently requested document. To get such information, the remote cache server 121 sends an inquiry to the user interest hinter 124. The inquiry may include the URL fingerprint of the document-being-requested and the identity of the requesting user provided by the user ID server 127. The user interest hinter 124 then returns a list of document names or URL fingerprints to the remote cache server 121. The document names identify or refer to candidate documents the requesting user is most likely to request next, or in the near future. Different mechanisms may be employed by the user interest hinter 124 in generating the list of candidate document names.

For each member in the list of candidate document names, the remote cache server 121 identifies the corresponding candidate document, if any, in the object archive 128. In some embodiments, the remote cache server 121 does not transmit the candidate documents to the requesting client until after transmitting the requested document. In some other embodiments, the candidate documents and the requested document may be transmitted to the client computer simultaneously. For example, in some embodiments there are multiple communication channels of different priorities between the remote cache server 121 and the client assistant 106. One or more communication channels of higher priorities are used for transmitting the requested document and other communication channels of lower priorities are used for transmitting (preloading) the candidate documents.

The server performance predictor 125 is used for predicting the performance of the document server 120. When a user requests a document from a client 102, the request can be met by either the document server 120 or a web host 132 that hosts the requested document. Depending on the configuration of the network 110 and the web host 132, there is no guarantee that the document server 120 will always serve the requested document faster than the web host 132. Sometimes, the document server 120 is more efficient than the web host 132. In other cases, serving the document from the web host 132 may be more efficient. To better serve the requesting user, the server performance predictor 125 may, periodically or episodically, compare the speeds of serving a document to a requesting client from a web host and the document server. The comparison result is provided to the client assistant 106 as a reference. If a particular web host outperforms the document server, the client assistant 106 will forward document requests to that web host whenever it receives a request for a document hosted by the web host. The comparison results are dynamically updated to reflect the dynamic nature of the network. If the client 102 is not sure which source (the document server or a web host) is more efficient in serving the document, it can consult the server performance predictor 125 for the identity of the source that is predicted to be the fastest or most efficient source of the document.

In some embodiments, there is a dedicated connection between the client assistant 106 and the remote cache server 121. This dedicated connection helps to reduce the communication latency between the client assistant 106 and the remote cache server 121. In one embodiment, the dedicated connection comprises at least one control stream and multiple data streams in each direction. These data streams serve as the communication channels between the remote cache server 121 and the client assistant 106. The remote cache server 121 uploads documents, including the requested document and the candidate documents, to the client assistant 106 using these data streams.

The control stream may be used to allow the client assistant 106 and the remote cache server 121 to exchange control information or alter the priorities of the data streams. For example, the remote cache server 121 initially transmits a candidate document to the client assistant 106 using a low priority data stream. After receiving an actual request for the candidate document, the remote cache server 121 can elevate the priority of the data stream using the control stream in order to serve the user request more promptly.

FIGS. 2A-2D depict data structures associated with various components of the client-server distributed system 100 according to some embodiments of the invention. For instance, the client cache 108 (in client 102) includes a table 201 having a plurality of URL fingerprints. In some embodiments, a URL fingerprint is a 64-bit binary number (or a value of some other predetermined bit length) generated from the corresponding URL by first normalizing the URL text, e.g., by applying a predefined set of normalization rules to the URL text (e.g., converting web host names to lower case), and then applying a hash function to the normalized URL text to produce the 64-bit URL fingerprint. These URL fingerprints correspond to the documents stored in the client cache 108. Each entry in the URL fingerprint table 201 points to a unique entry in another table 203 that stores the content information of a plurality of documents. Each entry in the table 203 includes a unique content fingerprint (also known as content checksum), one or more content freshness parameters and a pointer to a copy of the corresponding document content 205. In one embodiment, some of the content freshness parameters are derived from the HTTP header of the document content 205. For example, the Date field in the HTTP header indicates when the document was downloaded to the client 102.

The user interest hinter 124 manages a table 206 for storing information about the candidate documents that a user is likely to visit after viewing a particular document. In some embodiments, table 206 includes two columns 207 and 209. Column 207 contains a list of URL fingerprints. For each URL fingerprint in the column 207, there are one or more user interest hints in the corresponding entry of the column 209. These user interest hints are informed predictions or educated guesses of a user's navigation path. Whenever the remote cache server 121 receives a user request for a document, it passes a URL fingerprint corresponding to the requested document to the user interest hinter 124. The user interest hinter 124 in turn checks the table 206 and, if the table 206 contains a corresponding entry, returns information about the top-N candidate documents associated with the requested document. The remote cache server 121 then preloads the top-N candidate documents and their associated objects (sometimes called dependent objects) to the requesting client computer. Examples of associated (or dependent) objects include images, CSS files, and JavaScript files.

In the distributed system 100, the document server 120 serves as a proxy of multiple web hosts. It prefetches a large number of documents from many web hosts 132 and saves them in its index archive 122 and object archive 128. The index archive 122 maintains a mapping between a URL fingerprint in the URL fingerprint table 211 and a content fingerprint in the content fingerprint table 213. Each content fingerprint has associated caching information including, e.g., parameters indicating the freshness of the corresponding document content. In some embodiments, the set of freshness parameters includes an expiration date, a last modification date, and an entity tag, etc. The freshness parameters may also include one or more HTTP response header fields of a cached document. An entity tag is a unique string identifying one version of an entity, e.g., an HTML document, associated with a particular resource. The object archive 128 maps a content fingerprint in table 215 to a copy of the document content 217. In some embodiments, tables 211, 213 and 215 are small enough to reside in the main memory of one or more document servers. In other embodiments, the document contents 217 are stored in one or more secondary storage devices 220, e.g., one or more hard disk drives.

As noted in the background section, a cached object may not expire even though its associated expiration timestamp indicates so. Therefore, if a cached object is deemed fresh under certain metrics, the document server can upload the cache object to a client computer either in response to a client request or as a candidate object based on user browsing activities at the client computer.

Figure 3:
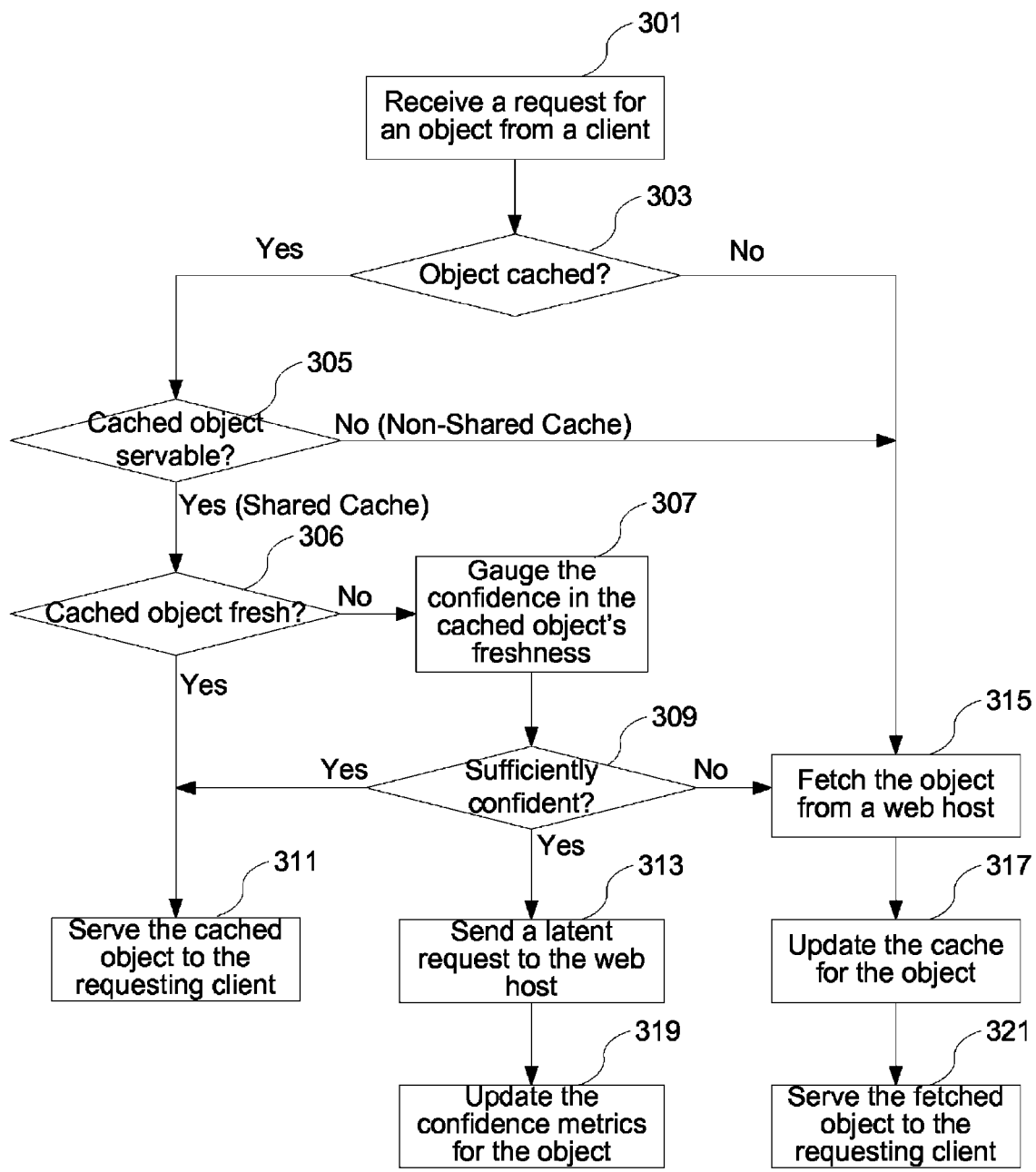
FIG. 3 is a flowchart illustrating a process of serving a cached object in response to a client request according to some embodiments of the invention.

FIG. 3 is a flowchart illustrating a process of the document server 120 serving a cached object in response to a client request according to some embodiments of the invention. But it will be apparent to one skilled in the art that the same process described below can be adopted by the client assistant 106 to serve a cached object in the client cache 108 to a client through the client application 104. This process is also applicable to the situation of preloading a candidate object. For an object requested by a client 102 (301), the document server 120 first looks in its index archive 122 and object archive 128 for the object. If the object is not in the archives and therefore not cached by the document server (303, no), the document server fetches the object from a web host (315), inserts the object into the index/object archives (317), and sends the object to the requesting client (321). In some other embodiments, the document server first sends the object to the requesting client and then updates its own cache using the newly fetched object.

If the document server finds the object in its cache (303, yes), it then conducts a set of checks before deciding whether or not to serve the cached object to the client. First, the document server checks if the cached object is servable (305). The servability of a cached object depends on the type of cache in which the object resides. For example, a cached copy of CNN's homepage is usually located in the document server's shared cache because the homepage is open to all visitors to www.cnn.com. The homepage has no authentication requirements and every visitor should get the same content within a short time period. But a customer's on-line shopping cart at www.amazon.com should be either non-cacheable or, even if cacheable, put in the document server's non-shared cache only accessible by the customer. This is reasonable since the cached copy may include the customer's private information such as login account or even credit card number.

In some embodiments, the servability check is implemented using the HTTP/1.1 Cache-Control response header values. For example, the header value "public" indicates that the HTTP response may be cached by any cache, shared or non-shared, even if it would normally be non-cacheable or cacheable only within a non-shared cache (e.g., an authenticated response). Accordingly, the document server puts the HTTP response in its shared cache as a servable object. In contrast, the header value "private" indicates that all or part of the HTTP response, authenticated or not, is intended for a specific user and must not be cached by a shared cache. The document server then keeps the response in its non-shared cache as a non-servable object.

Returning to FIG. 3, if the cached object is not servable, e.g., if it is located in the non-shared cache, the document server has to ask the corresponding web host for a new copy of the requested object (315, 317, and 321). But even if the object is servable, e.g., if it is located in the shared cache, it does not mean that the cached object is fresh. Therefore, the document server needs to check the freshness of the cached object (306). In some embodiments, this freshness check examines the HTTP/1.1 Expires header value, which gives the date/time after which the HTTP response is considered stale. If the cached object is deemed fresh (306, yes), it will be used for serving the requesting client immediately (311). Otherwise (306, no), the document server has to perform additional checks before making an object freshness decision.

As noted above, a cached object which is labeled as "stale" by the freshness check 306 may still be de facto fresh. To determine whether the cached object is de facto fresh, the document server gauges its confidence in the cached object's freshness (307). In some embodiments, the freshness confidence is essentially the probability that the cached object is fresh. A more detailed description of how to estimate the freshness confidence of a cached object is provided below in connection with FIGS. 4-7. If the document server does not have sufficient confidence in the object's freshness, e.g., if the estimated freshness confidence is lower than a predefined threshold (309, no), the document server may request a new copy of the cached object from the web host (315, 317, 321).

Note that the freshness confidence check does not yield a deterministic result. There is a quantifiable risk that a cached object passing the check is actually stale. In some embodiments, besides serving the cached object to the client (311), the document server also sends a latent request to the web host for a new copy of the cached object (313). The new copy has several uses. First, it replaces the cached copy in the index/object archives. Second, the document server can use the new copy to calibrate its confidence metrics for the object (319). If the new copy is different from the cached copy, i.e., a mistake was made at decision 309, the document server can adjust the threshold used at decision 309 (e.g., to require a higher level of confidence) so that cached objects of same or similar freshness confidence will not pass the check in the future. Third, the document server may correct the mistake by pushing the new copy to the requesting client and force-refreshing the client with the new document copy (i.e., causing the client to replace the old document copy with the new document copy, even if the old document copy is already being displayed). Alternatively, the document server can trigger the client to issue an alert, notifying the requesting user of the latest version. The user can decide whether or not to download the latest version.

Figure 4:
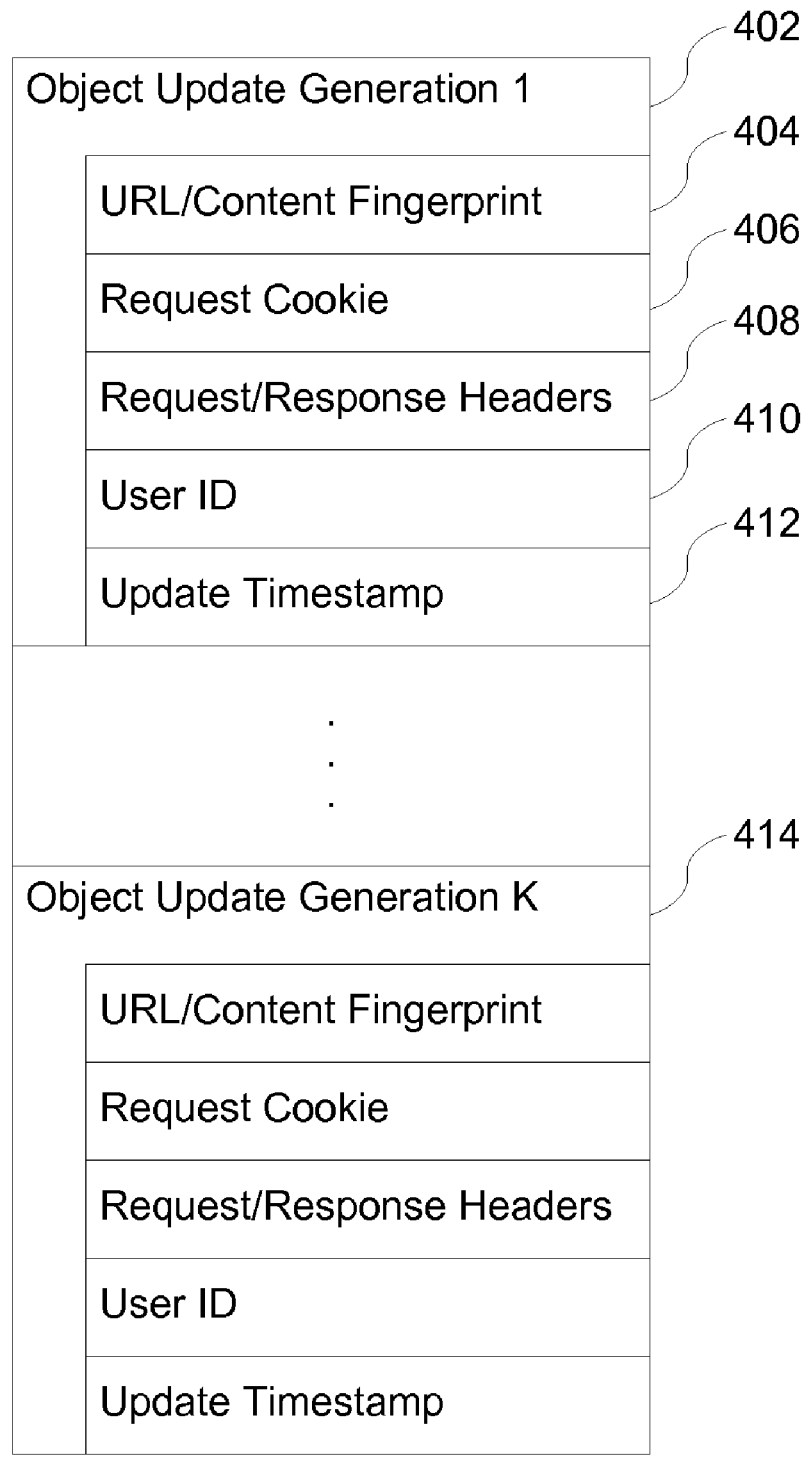
FIG. 4 is a block diagram illustrating the cache update history of a cached object according to some embodiments of the invention.

As noted above, the freshness confidence of a cached object is a parameter indicative of the likelihood that the object remains fresh after being cached for a certain time period. In some embodiments, this parameter is determined by referencing the object's cache update history. FIG. 4 is a block diagram illustrating the cache update history of a cached object according to some embodiments of the invention. The document server stores information related to the last K updates to the cached object in the cache update history data structure 400. In some embodiments, the data structure 400 is a first-in-first-out (FIFO) data buffer. Object update generation 1 402 is the most recent update and the object update generation K 414 is the least remote update.

Each object update generation further includes the URL/content fingerprint 404 (or a combination of both the URL fingerprint and the content fingerprint in some embodiments) of the cached object, a request cookie 406 of the cached object, HTTP request/response headers 408, a user ID 410, and an update timestamp 412. The URL or content fingerprint 404 identifies the content of the cached object that is or was cached in the document server. But different object update generations can have the same fingerprint and therefore the object content. The request/response headers 408 of a particular cache update generation include parameters indicative of the freshness (or staleness) of the cached object. These parameters are used by the document server in determining the object's freshness confidence. The user ID 410 and the request cookie 406 identify the user or client that requested or was served by the cached object in the past. Finally, the update timestamp 412 indicates when the object was updated by its web host. In some embodiments, the update timestamp 412 is the time when the object is cached by the document server. In some other embodiments, the update timestamp is an educated guess of when the web host updates the object based on information such as the object's response headers or other types of meta-data. Based on the update timestamps associated with past object update generations, the document server can statistically estimate the life expectancy of a newly cached object.

Figure 5:
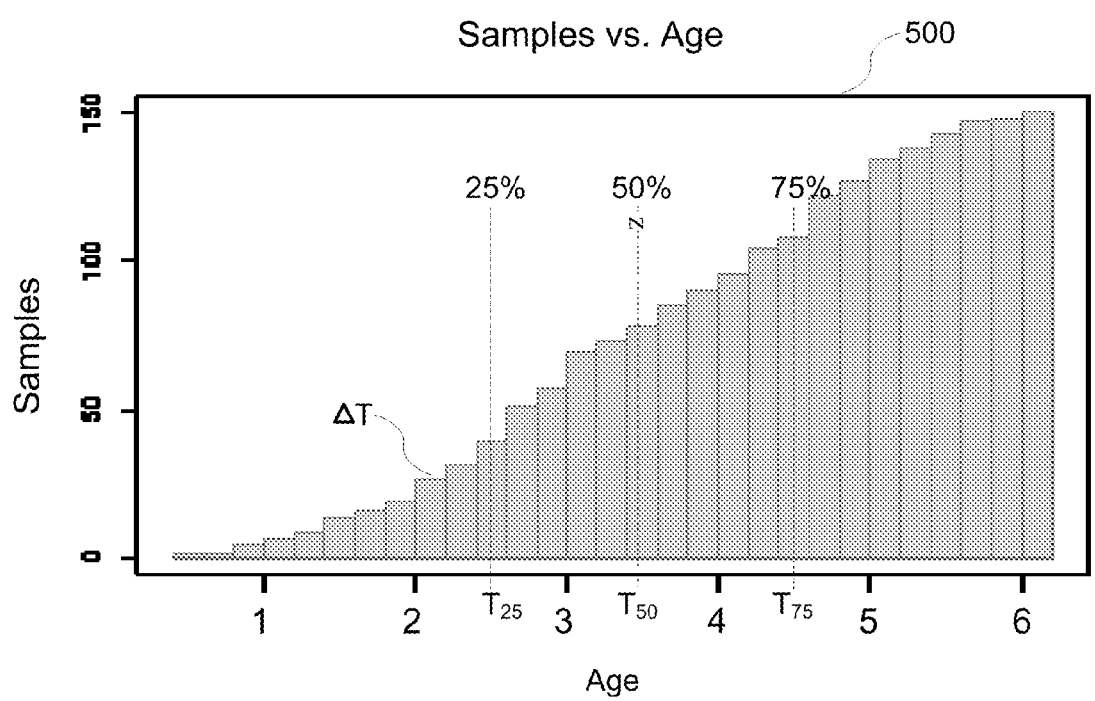
FIG. 5 is a block diagram illustrating a method of statistically estimating a cached object's life expectancy using a cumulative histogram according to some embodiments of the invention.

FIG. 5 is a block diagram illustrating a method of statistically estimating a cached object's life expectancy using a cumulative histogram 500 according to some embodiments of the invention. The cumulative histogram 500 is an intuitive, graphical representation of the age distribution of different generations of a cached object, all of which share the same URL. The horizontal axis "Age" of the cumulative histogram 500 measures the difference of update timestamps between two consecutive object update generations, which is an estimated age of a particular copy of the cached object. The vertical axis "samples" represents the number of samples of the cached object whose age is equal to or smaller than a particular age.

If the object update generation M's update timestamp is T1 and the object update generation (M+1)'s update timestamp is T2, the age of the cached object at generation M is $\Delta T = T2 - T1$. The cumulative histogram entry at $\Delta T$ represents the number of samples whose age is equal to or less than $\Delta T$. Each of histogram entries for object ages corresponding to particular percentile values (e.g., 25%, 50% and 75%) of the samples indicate the percentage of object samples whose age (or estimate age) was equal to or less than the age represented by that histogram entry. For example, among the approximately 150 samples, 25% of the samples (about 37 samples) have ages equal to or lower than $T_{25}$ and the other 75% of the samples (about 113 samples) have ages higher than $T_{25}$.

Before serving a cached object, the document server compares its estimated age against the cumulative histogram for the URL of the cached object. For example, if the estimated age of a cached object is close to $T_{50}$, this indicates that 50% of the cached objects in the past have ages greater than $T_{50}$ and 50% of the cached object in the past have ages smaller than $T_{50}$. This may be interpreted as that there is a 50-50 chance that the cached object remains fresh. In some embodiments, the document server sets different thresholds for different cached objects. For some types of objects whose content freshness is highly critical, the document server may choose a low age threshold, corresponding to a low percentile (e.g., 25%) location of the cumulative histogram, for assessing the cached object's freshness. When using a low age threshold, such as the 25% level in the cumulative histogram, a smaller number of cached objects will be deemed to be likely to be fresh than if a higher age threshold were used.

Figure 6:
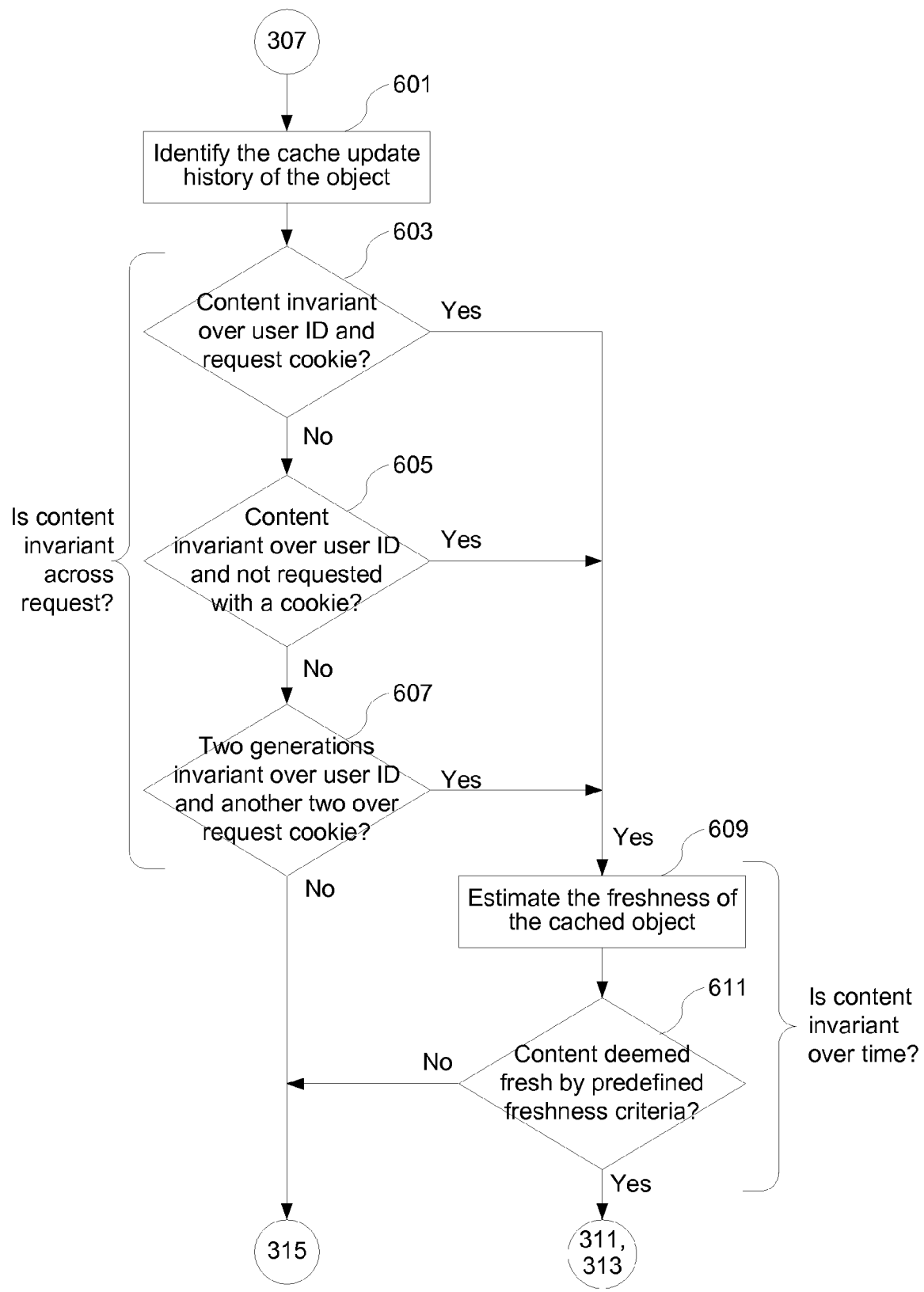
FIG. 6 is a flowchart illustrating a process of determining the freshness confidence of a cached object according to some embodiments of the invention.

FIG. 6 is a flowchart illustrating a process of determining the freshness confidence of a cached object using its cache update history and cumulative histogram according to some embodiments of the invention. For a cached object that fails the freshness check at decision 306, the document server first identifies its cache update history (601). Next, the document server performs a series of checks to determine whether the cache object's content is invariant across client requests. For example, if two object update generations of a cached object have different user IDs and request cookies but the same URL/content fingerprint (603, yes), the cached object is deemed request-invariant. In some embodiments, if the two object update generations having the same URL/content fingerprint have different user IDs but have not been requested with a cookie (605, yes), the cached object is also deemed request-invariant. In some other embodiments, some object update generations are always invariant over user ID and some other generations are always invariant over request cookie. As long as there is no inconsistent behavior (607, yes), the cached object is still deemed request-invariant. If the cached object fails all the three checks, the document server will not use it to serve a requesting client.

Even if the cached object passes one of the three checks, it is not necessarily time-invariant. To pass the time-invariant test, the cached object has to be sufficiently fresh. In some embodiments, the document server estimates the freshness of the cached object by comparing its age against its cumulative histogram (609). In some embodiments, one object's estimated freshness may be a reasonable approximation of another object's freshness if the two objects share some attributes in common. For example, two images downloaded from www.cnn.com at about the same time are deemed to have similar cacheability characteristics and therefore similar freshness. Some types of objects such as cascading style sheets (CSS) or JavaScript files change much less frequently than other types of objects, such as many HTML files. This generalized freshness information is particularly useful when estimating freshness for a cached object for which there is a shortage of other statistical information.

Given the cached object's age, the document server determines the number of samples that have an equal or smaller age and thereby a percentile value. The percentile value is used as a metric of the cached object's freshness. For example, a 10% percentile indicates that 90% of the past copies of the cached object have a life expectancy longer than the current age of the cached object. Thus, there is a high probability that the cached object is still fresh. Finally, the document server compares the percentile value against a predefined threshold. If the percentile is higher than the predefined threshold (611, no), the document server abandons the cached object and asks a new copy from the web host (315, 317, 321). Otherwise (611, yes), the document server serves the cached object (311) while, at the same time, submitting a latent request for the same object to the web host (313, 319).

Figure 7:
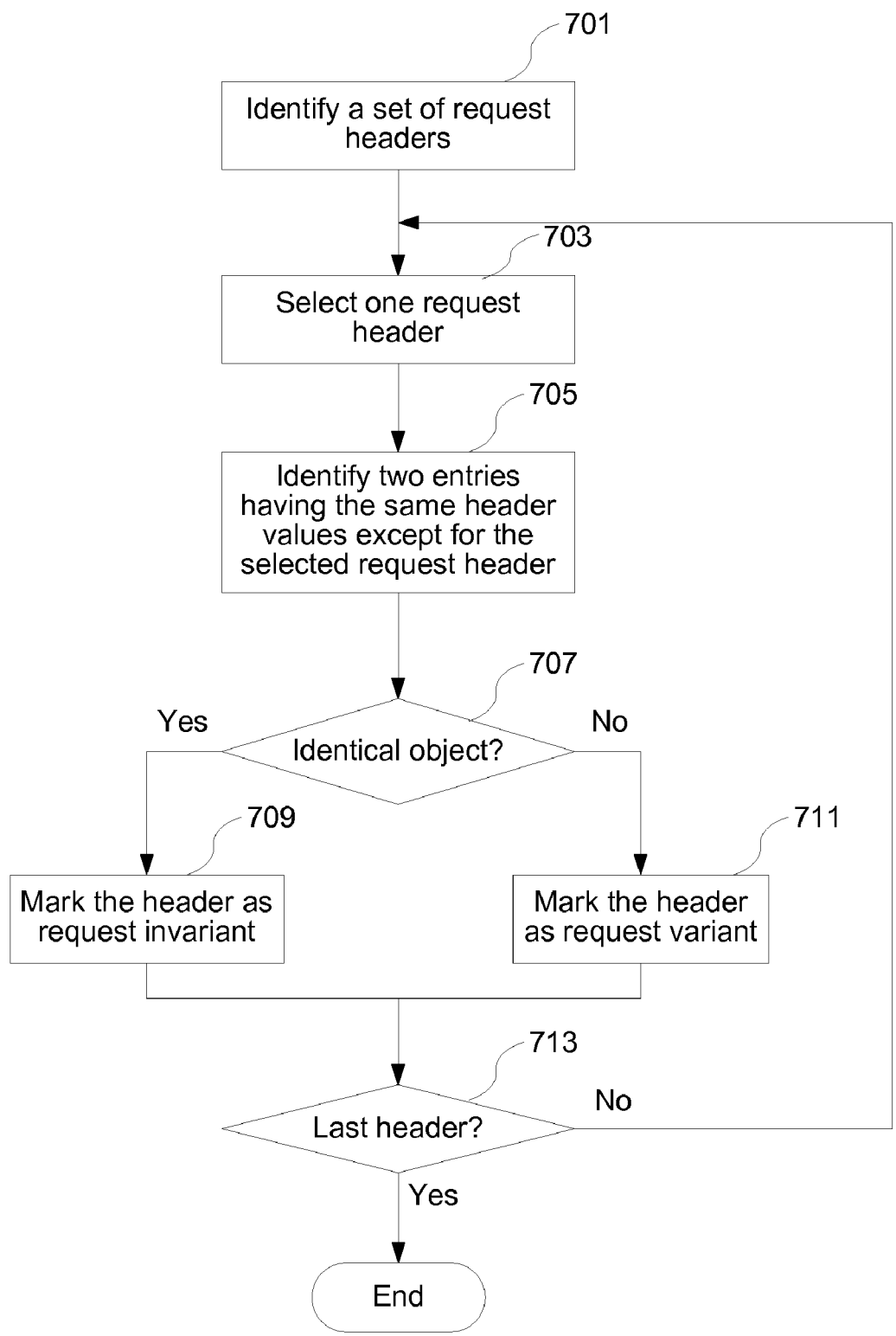
FIG. 7 is a flowchart illustrating a generic method of identifying request-invariant headers according to some embodiments of the invention.

The request-invariance checks mentioned above (603, 605, and 607) focus primarily on two variables, user ID and request cookie. But the cached object's content could vary over other request headers. FIG. 7 is a flowchart illustrating a more generic method of identifying request-invariant headers according to some embodiments of the invention. First, the document server identifies a set of request headers that could potentially affect the content of a corresponding response object (701). In some embodiments, the set of request headers is identified by excluding request headers that are known to typically have no impact on the response. For each selected request header (703), the document server looks through the cache update history for two entries that have the same values for all request headers except for the selected one (705). If the document fails to finds two such entries, it is assumed that the cache object's content is dependent upon the request header.

Otherwise, the document server compares the two entries' associated URL/content fingerprints (707). If the two entries have identical fingerprints and therefore identical content, the identified header is marked as a request-invariant header (709). In other words, such a request header has no weight in determining a cached object's content. When the document server determines whether the cached object can be used to satisfy a client request, it does not need to consider the identified request header's value. But if the two entries have different contents (707, no), there is at least a possibility that the request header caused the content change. Accordingly, the document server marks the request header as request-variant (711). Before serving the cached object to a requesting client, the document server has to make sure that the header value provided by the client is consistent with the current header value of the cached object. At the end of the process (713, yes), the document server identifies a list of request headers that is relevant to the content of a cached object. Note that this process is a heuristic approach based on limited samples of the cached object. The document server could make a mistake as to the relationship between a request header and the cached object.

Since the estimated freshness confidence of a cached object is a statistical parameter, the document server will mistakenly upload a stale object to a client from time to time. As noted above, the result of latent request caching can be used to refine the freshness confidence estimation of the cached object in the future. But this approach does not prevent mistakes made in the past. Below are two proactive approaches that prevent serving stale objects to a client through latent request caching.

Figure 8:
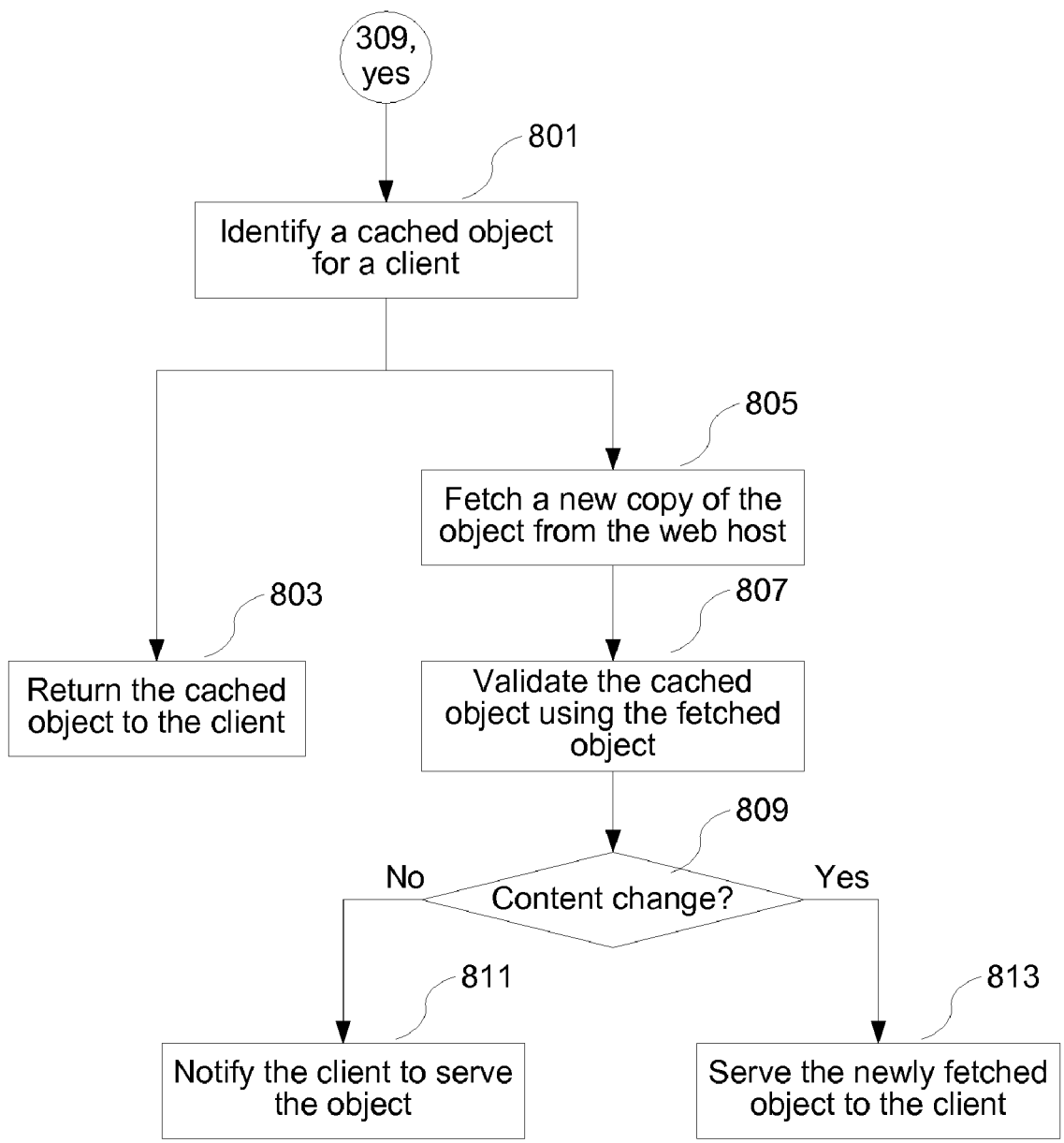
FIG. 8 is a flowchart illustrating a process of validating an object in a shared cache using latent request caching before serving the object to a client according to some embodiments of the invention.

FIG. 8 is a flowchart illustrating one process of validating an object in a shared cache using latent request caching before serving the object to a client according to some embodiments of the invention. After identifying a cached object that meets the predefined freshness criteria (801), the document server takes two actions independently. First, the document server transmits the cached object to the client (803). As part of the transmission, the document server asks the client to withhold serving the cached object to the requesting user until receiving a service approval notice from the document server.

At the same time, the document server submits a latent request to the web host for a new copy of the cached object (805). After receiving the new one, the document server compares the cached object with the new one (807). If these two are identical and there is no content change (809, yes), the document server notifies the client to serve the cached object sent to the client at 803. Otherwise (809, no), the document server sends the newly fetched object to the client to replace the old one (813).

In some embodiments, the document server keeps three options depending on the freshness confidence of a cached object. If the cached object has a very high or very low freshness confidence, the document server adopts the approach described above in connection with decision 309 of FIG. 3. But for a cached object whose freshness confidence is between the two extremes, the document server uses the approach shown in FIG. 8, as described above, to avoid serving stale content to a client.

So far, the aforementioned approaches are limited to cached objects in the shared cache. Indeed, these approaches exclude many cache entries in the non-shared cache. On the other hand, it is a common technique for a web host to prevent browser and/or proxy caching by marking its web pages as "private" although their contents are completely invariant across user IDs and request cookies.

Figure 9:
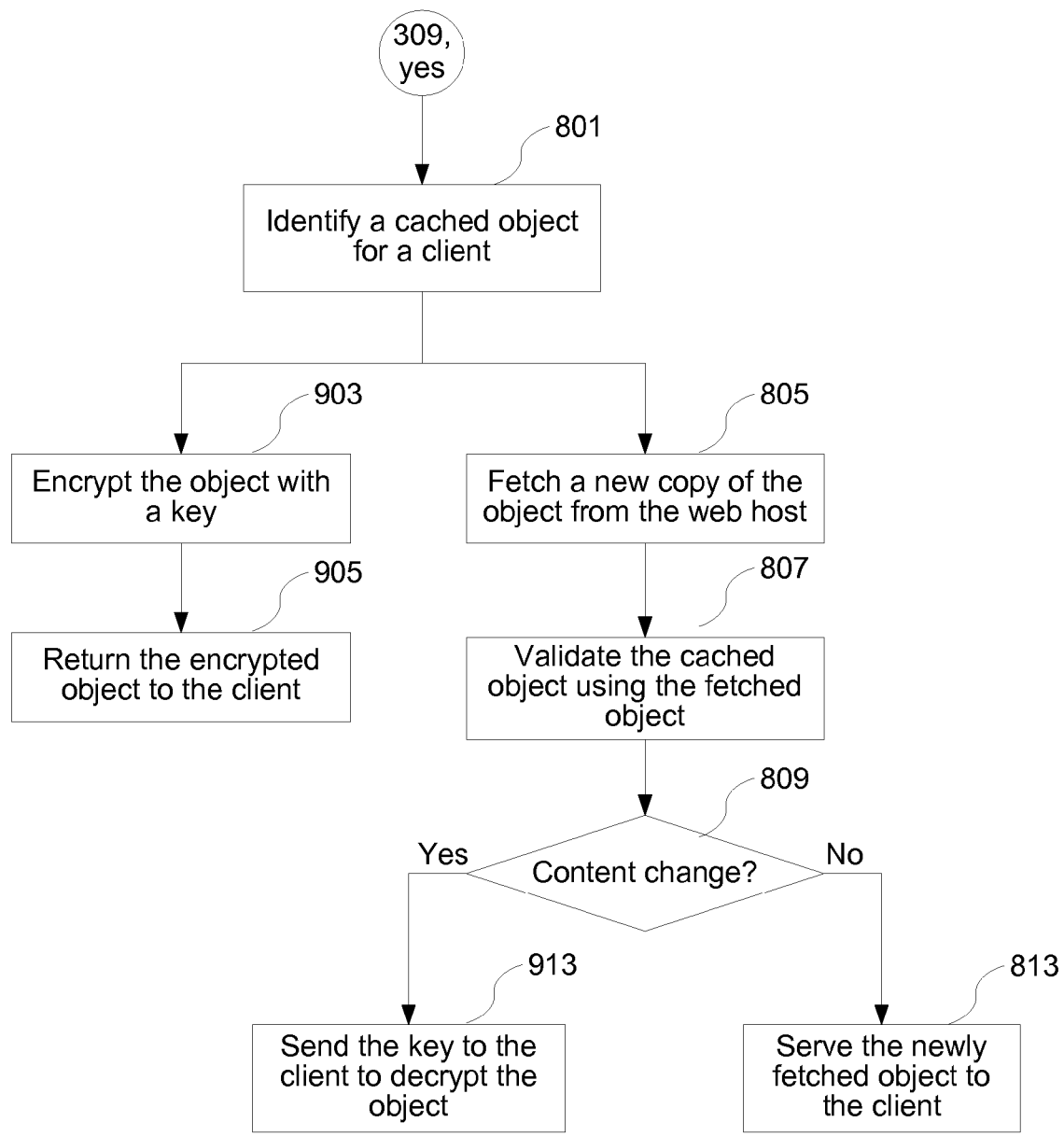
FIG. 9 is a flowchart illustrating a process of validating an object in a shared and/or non-shared cache using latent request caching before serving the object to a client according to some embodiments of the invention.

FIG. 9 is a flowchart illustrating a process of revalidating an object in a shared and/or non-shared cache before serving the object to a client without inadvertently exposing a user's private information, according to some embodiments of the invention. This process is similar to that shown in FIG. 8. One distinction is that the document server encrypts of the cached object with a predefined key (903) before sending the object to the client (905). This procedure prevents an unauthenticated user from acquiring private information associated with another party, even if the unauthenticated user receives the encrypted object.

Subsequently, after confirming that there is no content change as well as the identity of the requesting user (809, yes), the document server sends the key used previously for encrypting the cached object to the client (913). The client then decrypts the cached object it receives separately and renders the decrypted object to the requesting user. On the other hand, if there is any content change or if the cached object has any private information associated with another user, the document server sends the newly fetched object to the client (813).

In some embodiments, the document server encrypts all pre-fetched objects and stores the encrypted versions in its index/object archives. Each entry in the object archive includes a corresponding key used for encrypting the object. For example, different keys are used for encrypting different objects and different keys are also used for encrypting different generations of the same cached object to protect against inadvertent disclosure of a user's private information.

Figure 10:
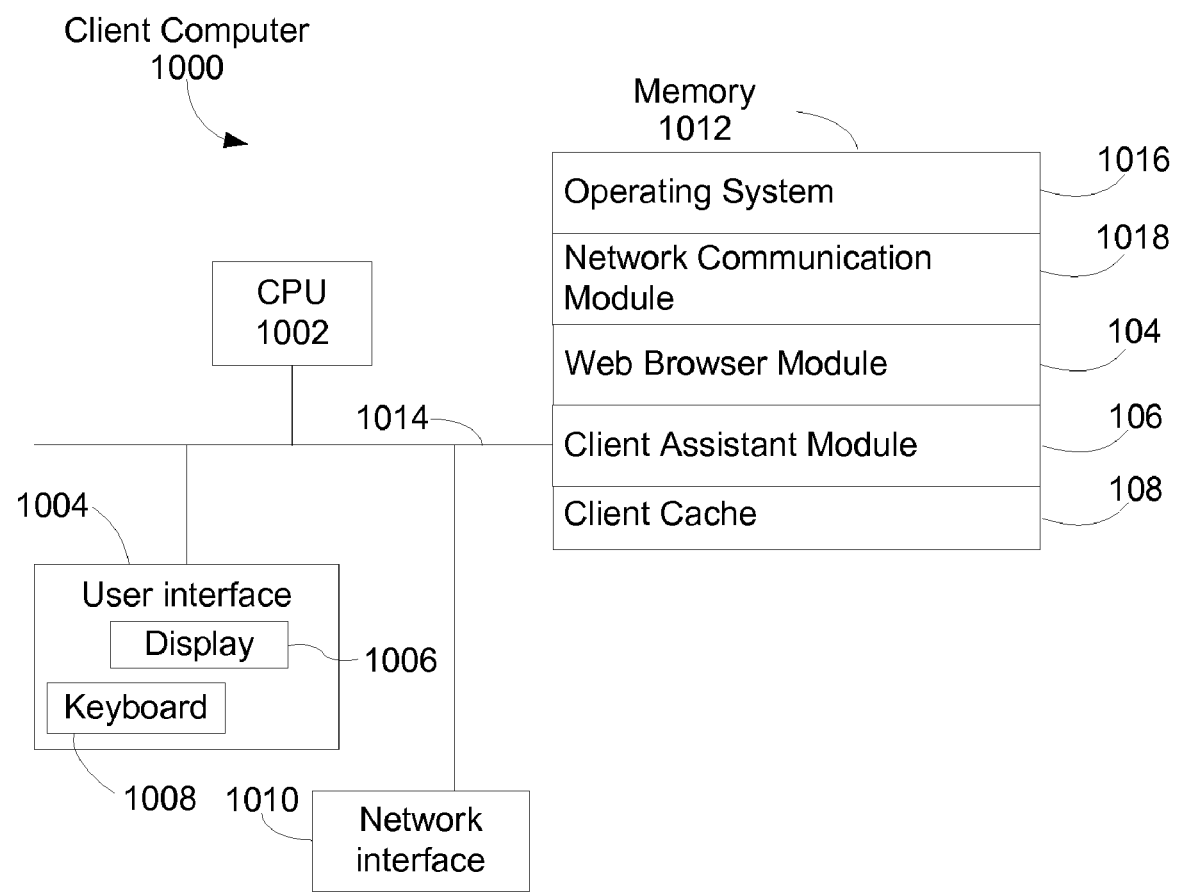
FIG. 10 is a block diagram of an exemplary client computer according to some embodiments of the invention.

FIG. 10 depicts a client computer 1000 in accordance with some embodiments of the present invention, which typically includes one or more processing units (CPU's) 1002, one or more network or other communications interfaces 1010, memory 1012, and one or more communication buses 1014 for interconnecting these components. The one or more communication buses 1014 may include circuitry (sometimes called a chipset) that interconnects and controls communications between system components. The client computer 1000 may also include a user interface 1004 comprising a display device 1006 and a keyboard 1008. Memory 1012 may include high speed random access memory and may also include non-volatile memory, such as one or more magnetic disk storage devices. Memory 1012 preferably stores the following programs, modules and data structures, or a subset or superset thereof:

- an operating system 1016 that includes procedures for handling various basic system services and for performing hardware dependent tasks;
- a network communication module (or instructions) 1018 that is used for connecting the client computer 1000 to other computers via the one or more communication network interfaces 1010 and one or more communication networks, such as the Internet, other wide area networks, local area networks, metropolitan area networks, and the like;
- an application (or instructions) 104, such as a web browser application, for receiving a user request for a document and rendering the requested document on a computer monitor or other user interface device;
- a client assistant module (or instructions) 106, as described elsewhere in this document; and
- client cache 108 for storing user-requested documents and preloaded documents.

Figure 11:
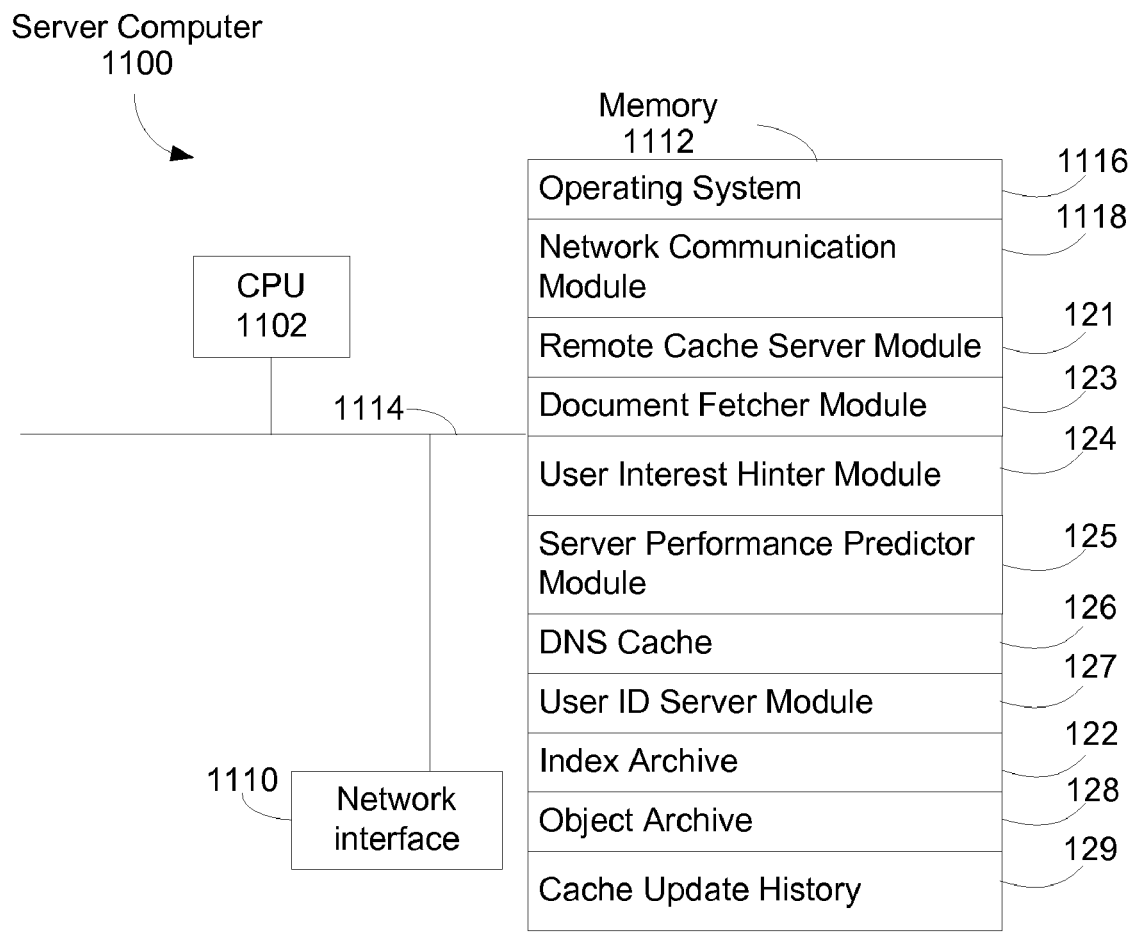
FIG. 11 is a block diagram of an exemplary server computer according to some embodiments of the invention.

Similarly, FIG. 11 depicts a server computer 1100 in accordance with one embodiment of the present invention, which typically includes one or more processing units (CPU's) 1102, one or more network or other communications interfaces 1110, memory 1112, and one or more communication buses 1114 for interconnecting these components. The one or more communication buses 1114 may include circuitry (sometimes called a chipset) that interconnects and controls communications between system components. Memory 1112 may include high speed random access memory and may also include non-volatile memory, such as one or more magnetic disk storage devices. Memory 1112 preferably stores the following programs, modules and data structures, or a subset or superset thereof:

an operating system 1116 that includes procedures for handling various basic system services and for performing hardware dependent tasks;

a network communication module (or instructions) 1118 that is used for connecting the server computer 1100 to other computers via the one or more communication network interfaces 1110 and one or more communication networks, such as the Internet, other wide area networks, local area networks, metropolitan area networks, and the like;

a remote cache server module (or instructions) 121 for receiving a document retrieval request from a client assistant and transferring the requested document and candidate documents to the client assistant 106;

a document fetcher module (or instructions) 123 for retrieving documents from different web hosts;

a user interest hinter module (or instructions) 124 for predicting a user's browsing interest based on various types of user activities, such as mouse cursor movements, usage statistics, and the layouts of the documents retrieved from different web hosts;

a server performance predictor module (or instructions) 124 for comparing the speeds of serving a document to a requesting client computer from a web host and the server computer;

a DNS cache 126 for storing records that map the hostnames of the web hosts to their respective IP addresses;

a user ID server module (or instructions) 127 for storing records of the users using the server computer;

an index archive 122 for storing a plurality of document identity records; in an exemplary embodiment each record includes a document's URL fingerprint, a document content fingerprint and document content freshness parameters;

an object archive 128 for managing a plurality of documents; in an exemplary embodiment, each record includes a document's content fingerprint and a copy of the document content; and a data structure 129 for storing the cache update histories of different objects stored in the index/object archives.

While FIG. 11 shows a "server," FIG. 11 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 11 could be implemented on single servers and single items could be implemented by one or more servers. The actual number of servers used to implement a website server and how features are allocated among them will vary from one implementation to another, and may depend in part on the amount of data traffic that the system must handle during peak usage periods as well as during average usage periods.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A computer-implemented method, comprising:
   at a server computer with memory and one or more processors,
   in response to a request, received from a client computer, for a document:
      identifying a cached instance of the document stored at the server and a cache update history associated with the document;
      identifying from the document's cache update history a set of previous document requests for the document, a corresponding set of document request parameters and a plurality of header values that have been assigned to each document request parameter; and
      in accordance with a determination that for the set of previous document requests for the document the content of the document has been the same regardless of which header value was assigned to each document request parameter and that the cached instance of the document is deemed fresh according to the document's cache update history:
         transmitting the cached instance of the document from the server computer to the client computer and fetching a new instance of the document from a host; and
         updating the document's cache update history using the fetched instance of the document.

2. The method of claim 1, wherein the cached instance of the document is deemed fresh when the content of the cached instance of the document has an estimated age lower than those of a predetermined portion of past content updates for which information is recorded in the document's cache update history.

3. The method of claim 1, further comprising:
   determining that the fetched instance of the document is different from the cached instance of the document, and sending the fetched instance of the document to the client computer so as to replace the cached instance of the document transmitted to the client computer.

4. The method of claim 1, further comprising:
   determining that the fetched instance of the document is different from the cached instance of the document; and
   alerting the client computer that there is a newer version of the document.

5. A system for serving documents to a user at a client device, comprising:
   memory;
   at least one processor; and
   at least one program stored in the memory and executed by the at least one processor in response to a request, received from a client computer, for a document, the at least one program including:
      instructions for identifying a cached instance of the document stored in the memory and a cache update history associated with the document;
      instructions for identifying from the document's cache update history a set of previous document requests for the document, a corresponding set of document request parameters and a plurality of header values that have been assigned to each document request parameter; and
      instructions for determining that for the set of previous document requests for the document the content of the document has been the same regardless of which header value was assigned to each document request parameter and that the cached instance of the document is deemed fresh according to the document's cache update history, and in accordance with the determination:

transmitting the cached instance of the document to the client computer and fetching a new instance of the document from a host; and updating the document's cache update history using the fetched instance of the document.

6. The system of claim 5, wherein the cached instance of the document is deemed fresh when the content of the cached instance of the document has an estimated age lower than those of a predetermined portion of past content updates for which information is recorded in the document's cache update history.

7. The system of claim 5, further comprising:

instructions for determining that the fetched instance of the document is different from the cached instance of the document, and sending the fetched instance of the document to the client computer so as to replace the cached instance of the document transmitted to the client computer.

8. The system of claim 5, further comprising:

instructions for determining that the fetched instance of the document is different from the cached instance of the document; and alerting the client computer that there is a newer version of the document.

9. A computer program product for use in conjunction with a computer system, the computer program product comprising a computer readable storage medium and a computer program mechanism embedded therein, the computer program mechanism executing in response to a request, received from a client computer, for a document and the computer program mechanism comprising:

instructions for identifying a cached instance of the document stored on the computer readable storage medium a cache update history associated with the document;

instructions for identifying from the document's cache update history a set of previous document requests for the document, a corresponding set of document request parameters and a plurality of header values that have been assigned to each document request parameter; and instructions for determining that for the set of previous document requests for the document the content of the document has been the same regardless of which header value was assigned to each document request parameter and that the cached instance of the document is deemed fresh according to the document's cache update history, and in accordance with the determination:

transmitting the cached instance of the document to the client computer and fetching a new instance of the document from a host; and updating the document's cache update history using the fetched instance of the document.

10. The computer program product of claim 9, wherein the cached instance of the document is deemed fresh when the content of the cached instance of the document has an estimated age lower than those of a predetermined portion of past content updates for which information is recorded in the document's cache update history.

11. The computer program product of claim 9, further comprising:

instructions for determining that the fetched instance of the document is different from the cached instance of the document, and sending the fetched instance of the document to the client computer so as to replace the cached instance of the document transmitted to the client computer.

12. The computer program product of claim 9, further comprising:

instructions for determining that the fetched instance of the document is different from the cached instance of the document; and alerting the client computer that there is a newer version of the document.

13. A system for serving documents to a user at a client device, comprising:

memory;

a processor;

means for receiving a request, from a client computer, for a document;

means for identifying a cached instance of the document stored in the memory and a cache update history associated with the document;

means for identifying from the document's cache update history a set of previous document requests for the document, a corresponding set of document request parameters and a plurality of header values that have been assigned to each document request parameter; and means for determining that for the set of previous document requests for the document the content of the document has been the same regardless of which header value was assigned to each document request parameter and that the cached instance of the document is deemed fresh according to the document's cache update history, and in accordance with the determination:

transmitting the cached instance of the document to the client computer and fetching a new instance of the document from a host; and updating the document's cache update history using the fetched instance of the document.

\* \* \* \* \*